J. F. KELLER.
FISH CLEANING MACHINE.
APPLICATION FILED JULY 11, 1916.
1,204,993.
Patented Nov. 14, 1916.
3 SHEETS—SHEET 2.
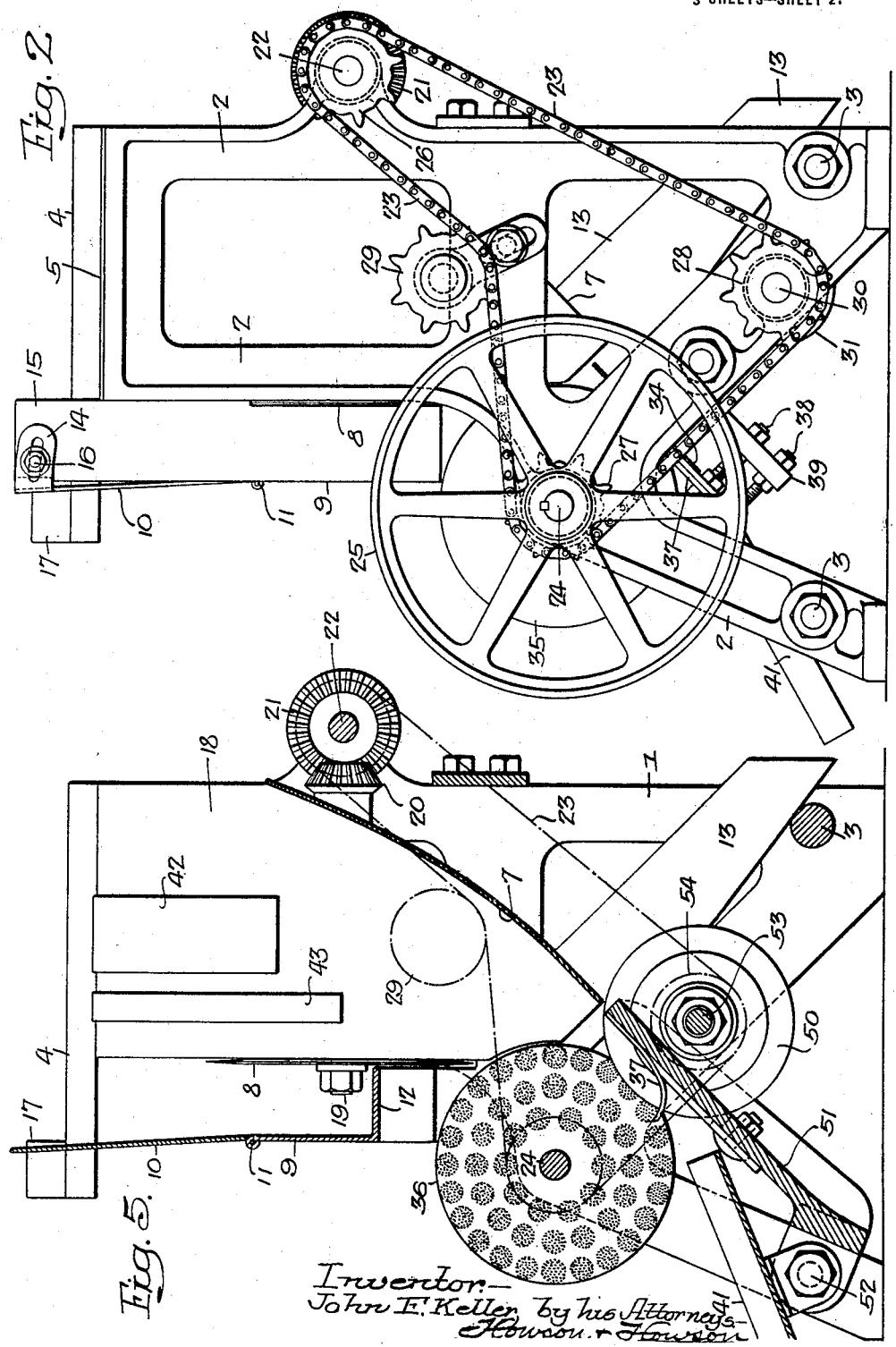

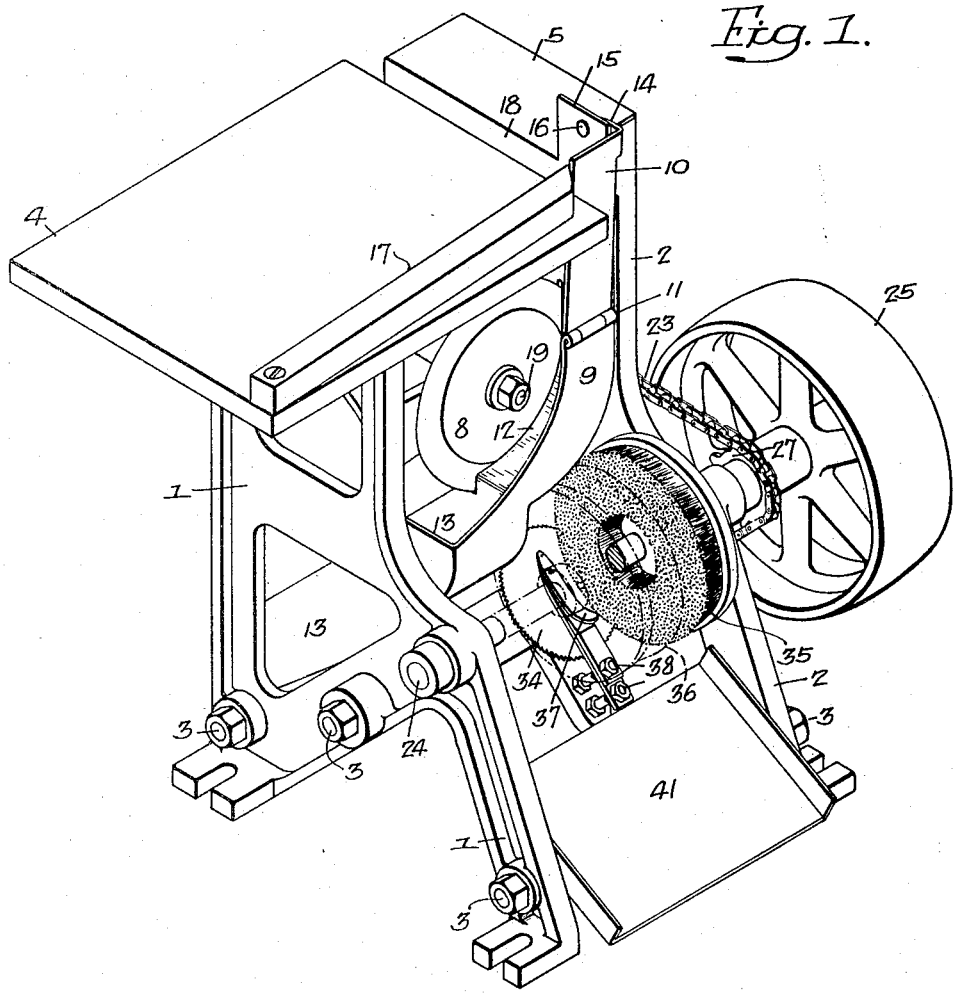

J. F. KELLER.
FISH CLEANING MACHINE.
APPLICATION FILED JULY 11, 1916.
1,204,993.
Patented Nov. 14, 1916.
3 SHEETS—SHEET 3.
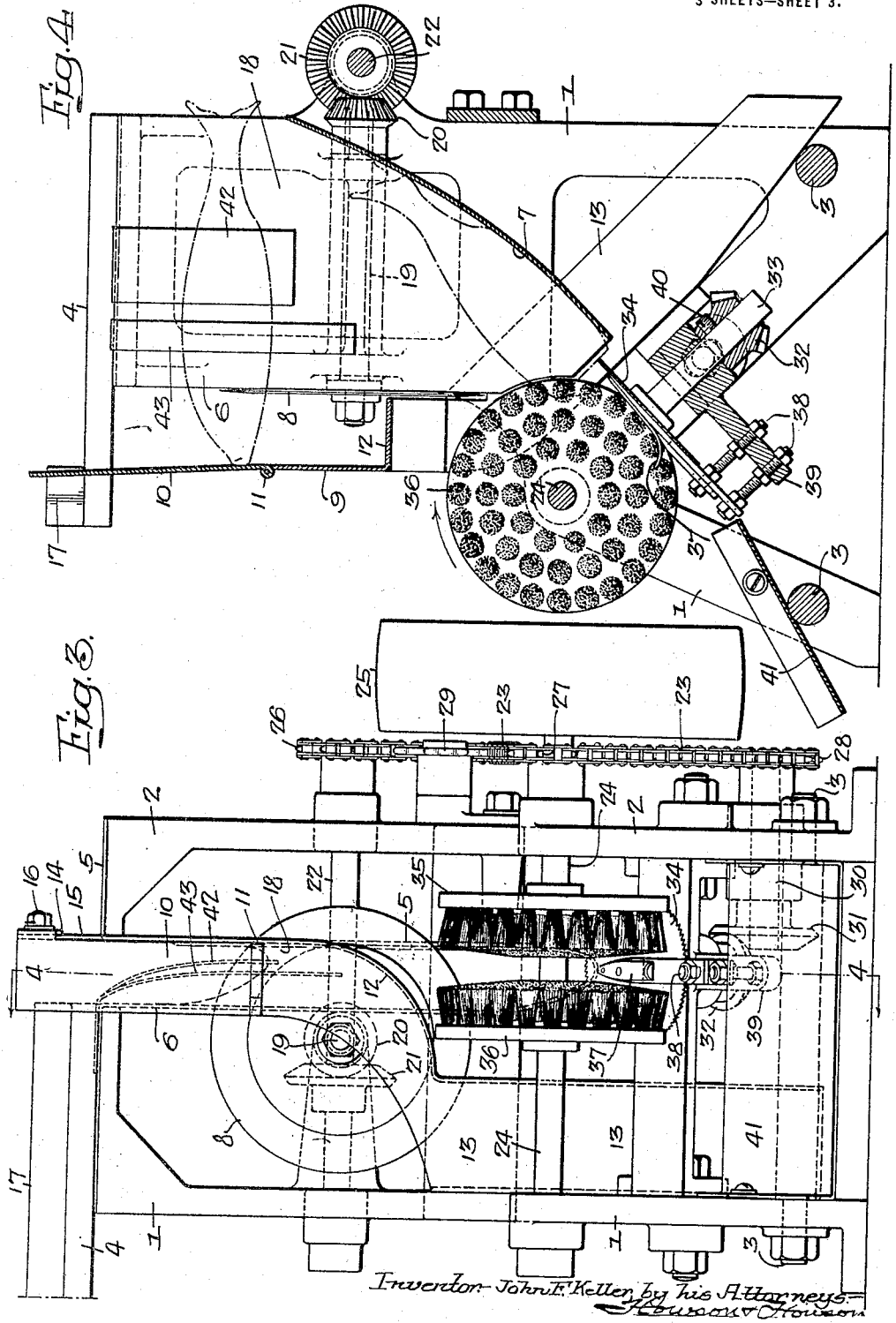
Inventor—John F. Keller by his Attorneys
Howson & Howson

UNITED STATES PATENT OFFICE.

JOHN F. KELLER, OF PHILADELPHIA, PENNSYLVANIA.

FISH-CLEANING MACHINE.

1,204,993.

Specification of Letters Patent.

Patented Nov. 14, 1916.

Application filed July 11, 1916. Serial No. 108,621.

*To all whom it may concern:*

Be it known that I, JOHN F. KELLER, a citizen of the United States, residing in Philadelphia, Pennsylvania, have invented a Fish-Cleaning Machine, of which the following is a specification.

One object of my invention is to provide a machine for cleaning and scaling such fish as herring, which machine, while being relatively simple and certain in its action, shall be capable of satisfactorily operating at a high speed to clean large numbers of fish in a given time.

It is further desired to provide a machine of the type noted in which means are provided for successively cutting off the head and removing the entrails of a fish; the arrangement of parts being such that the head after removal is directed away from the body which is thereafter scaled and gutted.

I also desire to provide a novel arrangement of beheading, scaling and cleaning means which shall be capable of operating for long periods without attention or likelihood of a breakdown.

Another object of the invention is to provide a fish cleaning machine in which, after the fish have been fed in by hand, they are successively beheaded and thereafter delivered to scaling brushes in such a manner that while moving between the latter they are operated on to remove the entrails; the invention contemplating a novel arrangement of parts for holding and guiding the fish during the several operations.

These objects and other advantageous ends I secure as hereinafter set forth, reference being had to the accompanying drawings, in which, Figure 1 is a perspective view of a fish cleaning machine constructed according to my invention; Figs. 2 and 3 are respectively a side and an end elevation of the machine shown in Fig. 1; Fig. 4 is a vertical section on the line 4—4, Fig. 3; and Fig. 5 is a vertical section of a slightly modified form of the invention.

In Figs. 1 to 4 of the above drawings 1 and 2 represent two substantially parallel side frame structures rigidly connected together at suitable points by bolts 3 extending between them and having their tops extended toward each other but spaced apart to provide a slot extending from the front to the rear of the machine. The frame member 1 has mounted on it a flat plate or top 4 forming a receiving table and two bodies of sheet metal 5 and 6 extend downwardly from the top edges of the slot to form a narrow chute 18 which has a bottom 7 steeply inclined toward the front of the machine. Said chute also has a front formed of two plates 9 and 10, of which the latter extends vertically and is hinged at 11 to the plate 9. This latter is preferably bent in at right angles to form the bottom 12 of a second chute, which after passing a disk cutter 8 for beheading the fish, turns at right angles and extends downwardly at a sharp incline as indicated at 13 so as to direct the heads of the fish into any suitable container placed at the rear of the machine.

The plate 10 projects above the level of the table 4, having one side edge extended and then bent at right angles to lie parallel with an upward extension 15 on the plate 5 forming part of the main chute. As shown in Fig. 2, this extension 14 is slotted to receive a bolt 16 whereby the plate 10 may be held in any adjusted position so as to regulate the position of each fish relatively to the cutter 8 as it is dropped into the chute 18. The front of the table has pivoted to it at a point adjacent that side distant from this feed chute a bar 17 which extends across its front edge and preferably engages the upper end of the plate 10 so as to coact therewith in providing a gage for properly positioning the fish prior to their introduction to the chute 18, this bar being swung on its pivot when the plate 10 is adjusted.

The disk cutter 8 is fixed to and driven by a shaft 19 carried in suitable bearings in the frame structure and in turn driven through beveled gears 20 and 21 from a shaft 22 on which is mounted a sprocket wheel 26. Also carried in suitable bearings on the frame is a driving shaft 24 parallel with the shaft 22 and having keyed to it a pulley 25 driven from any suitable source of power. This main shaft also has fixed to it a sprocket wheel 27 connected with the wheel 26 by a sprocket chain 23, which also passes around an idler sprocket 29 and a sprocket wheel 28 fixed to a shaft 30. This latter shaft has fixed to it a beveled gear 31 meshing with a second beveled gear 32 adjustably mounted on a shaft 33 on whose upper end is mounted a circular saw or cutter 34 which is rotatable in a plane practically parallel with but slightly displaced from the plane of the lower part of the chute bottom 7, its position being such that it will cut through the lower portion of the belly and entrails of a fish sliding down the chute in the position shown in Fig. 4.

Fixed to the main shaft 24 on either side of the line of the chute formed by the sides 5 and 6 and bottom 7 are a pair of scaling members 35 and 36 in the form of a pair of brushes spaced apart and mounted immediately above the upper side of the circular cutter 34 so as to operate on the sides of a fish as it passes downwardly over said cutter.

An entrail-removing hook or finger 37 extends over and immediately adjacent the upper surface of the saw 34 and terminates a short distance below the lower end of the chute 5—6—7, being adjustably mounted on a pair of screws 38, carried by a bracket 39 projecting from the bearing which supports the shaft 33. It is noted that said hook or finger is adjustably mounted on said screws so as to permit it being raised or lowered relatively to the bracket 39 so that it may at all times be placed in the proper operative relation to the saw 34. This may also be adjusted to vary the depth of the cut made in the fish, by slacking off the set screw 40 whereby the beveled gear 30 is held to the shaft 33 and thereafter moving said shaft in its bearing to bring said saw or cutter into the desired position. The set screw is then tightened. A fish directing chute 41 is placed below the lower end of the entrail remover and brush scaling wheels so as to direct the fish after they have been cleaned, into any suitable receptacle.

For directing the fish toward one side of the chute 5—6 so that they will be in the best position to be operated on by the cutter 8, I provide spring plates 42 and 43, which as shown in Fig. 3, project downwardly in said chute from one side thereof toward the opposite side of the chute.

Under operating conditions fish delivered to the table are turned so that their heads are immediately adjacent or in contact with the gage bar 17, after which they may be moved parallel with and toward the chute 18 into which they are successively fed. As a fish moves downwardly in the chute with its head practically in engagement with the plate 10, it is pressed toward the frame member 2 by the springs 43 and 42 and is finally engaged by the cutter 8 which feeds it downwardly and in so doing removes its head. While the latter falls into and is discharged from the machine through the chute 13, the body after passing by the cutter, is caused to turn from the substantially horizontal position shown at the upper part of Fig. 4, into the inclined position with the belly in contact with the chute bottom 7, the fish being fed into the chute 18, belly down.

After the head end of the body passes below the cutter 8, it moves downwardly under this by reason of the action of gravity into a position between the two brushes 35 and 36, which turning in the direction of the arrow, Fig. 4, move it over the saw or cutter 34. This acts to cut through and remove the lowermost portions of the belly, making it possible for the entrails, which catch on the upwardly turned lower end of the hook 37, to be completely removed. While the body is passing between the brush wheels, these act upon it to remove the scales, since the action of the cutter 34 serves to sufficiently retard the progress of the fish to render this action possible.

The scaled and cleaned fish after passage between the brushes is received by the chute 41 which delivers it to any suitable container, and the entrails fall away on either side of the hook 37, being caught in a suitable container beneath the frame of the machine.

Since fish of certain varieties are larger at the beginning of a run than toward the end thereof, it is at first possible when operating upon them, to so adjust the plate 10 away from its vertical position that the cutter 8 is caused to engage them at the proper point to remove the relatively large heads. Later when smaller fish are received, the plate 10 may be moved toward the vertical position in order to direct the fish farther to the rear of the machine and cause a shorter length to be cut off of each fish by the beheading operation.

In that form of the invention shown in Fig. 5, I have replaced the cutter 34, which severs the bellies of the fish and operates in a plane parallel with their line of motion, by a cutter 50 which merely slits the fish longitudinally as they are passing between the brush wheels, and in this case I depend upon the hook-like member 37 to forcibly remove the entrails as the slitted body passes over it. This cutter projects through a slot formed in an inclined guide 51 which practically forms a continuation of the chute bottom 7 and is suitably supported from the frame structure by bolts 52. Said guide carries the entrail-removing hook 37 and the bolts 52 serve to also support the delivery chute 41.

It is noted that the plate 42 is preferably shorter but wider than the plate 43 which lies between it and the beheading cutter 8. In the case shown in Fig. 5 the cutter 50 is mounted upon a horizontal shaft 53 having fixed to it a sprocket 54 driven by the sprocket chain 23 in the manner illustrated in Figs. 1 to 4 inclusive.

I claim:—

1. The combination in a fish cleaning machine of a supporting structure having a relatively narrow chute for the reception of fish; a beheading cutter extending across said chute; a pair of rotary scaling members placed to form sides for the chute below and to one side of said cutter; and means for removing the entrails of each fish while it is engaged by said scaling members.

2. The combination in a fish cleaning machine of a supporting structure having a narrow substantially vertical chute for the reception of a succession of fish; a beheading cutter extending across said chute; an inclined bottom for the chute placed to receive and direct downwardly fish after they have been acted on by the cutter; and scaling members placed to receive fish from said inclined bottom; with means for removing the entrails from the fish.

3. The combination in a fish cleaning machine of a supporting structure having a substantially vertical, narrow chute for the reception of a succession of fish; a beheading cutter extending across said chute; an inclined bottom placed to direct fish under the cutter after they have been acted on by the same; an entrail removing device placed to receive fish from said inclined bottom; and rotary scaling members placed to move the fish over the entrail removing device while they are being scaled.

4. The combination in a fish cleaning machine of a supporting structure having a narrow chute, including an inclined bottom, for the reception of a succession of fish; means for beheading the fish as they pass through said chute; a belly opening cutter placed to receive fish from the inclined bottom; entrail removing means; and scaling members placed to forcibly move the fish past said entrail removing means.

5. The combination in a fish cleaning machine of a supporting structure forming a relatively narrow chute for the reception of a succession of fish and including an inclined bottom; a rotary cutter operative in a plane substantially parallel to the plane of said inclined bottom for cutting the bellies of the fish; and an entrail removing device placed to act on the fish after they have been engaged by said cutter.

6. The combination in a fish cleaning machine of a supporting structure having a downwardly inclined bottom; a rotary cutter operative in a plane substantially parallel to the plane of said inclined bottom; and an entrail removing device extending across the top of the cutter in the line of the chute.

7. The combination in a fish cleaning machine of a chute having a downwardly inclined bottom; a rotary cutter operative in a plane substantially parallel to the plane of said inclined bottom; an entrail removing device extending across the top of the cutter in the line of the chute; with a pair of rotary scaling members placed to engage and forcibly move each fish past the entrail removing device.

8. The combination in a fish cleaning machine of a structure forming a narrow, substantially vertical chute; a beheading cutter extending across said chute; a second chute for conveying away the heads of successive fish; and means for removing the entrails of the fish after they have passed said cutter.

9. The combination in a fish cleaning machine of a narrow substantially vertical chute having a downwardly inclined bottom; a beheading cutter extending across said chute but spaced away from said inclined bottom; and an entrail removing device placed to receive and act on fish moving on said bottom under said cutter.

10. The combination in a fish cleaning machine of a narrow substantially vertical chute having a downwardly inclined bottom; a beheading cutter extending across said chute but spaced away from said inclined bottom; and an entrail removing device placed to receive and act on fish moving on said bottom under said cutter, said device including a rotary cutter operative in a plane substantially parallel to the plane of said inclined bottom.

11. The combination in a fish cleaning machine of a supporting structure having a narrow substantially vertical chute including a downwardly inclined bottom; a beheading cutter extending across said chute but spaced away from said bottom; an entrail removing device placed to receive and act on fish moving on said bottom including a rotary cutter operative in a plane substantially parallel to the plane of said inclined bottom; with a pair of rotary scaling members placed to forcibly move the fish over said device.

12. The combination in a fish cleaning machine of a structure forming a chute including an inclined bottom; a rotary cutter mounted substantially parallel to the plane of said bottom; a driving shaft carrying said cutter and adjustable to vary the position of the latter; with an entrail removing device extending adjacent the cutter.

13. The combination in a fish cleaning machine of a structure forming a chute including an inclined bottom; a rotary cutter mounted substantially parallel to the plane of said bottom; a driving shaft carrying said cutter and adjustable to vary the position of the latter; an entrail removing device extending adjacent the cutter and including a hooked structure; with a pair of rotary members for moving the fish over said hooked structure.

14. The combination in a fish cleaning machine of a structure forming a chute including an inclined bottom; a rotary cutter mounted substantially parallel to the plane of said inclined bottom; a driving shaft carrying said cutter and adjustable to vary the position of the latter; an entrail removing device extending adjacent the cutter and including a hooked structure; a pair of rotary members for moving the fish over said hooked structure; and means for adjusting said hooked structure to suit it to the adjustment of said cutter.

15. The combination in a fish cleaning machine of a receiving table having a narrow substantially vertical chute adjacent one side; a beheading cutter extending across said chute; and an entrail removing device placed to receive fish from the chute after they have been acted on by said cutter.

16. The combination in a fish cleaning machine of a receiving table; a structure forming a chute leading from one side of said table; a beheading cutter extending across the chute; and means for adjusting one of the walls of the chute to alter the point at which the fish are engaged by said cutter.

17. The combination in a fish cleaning machine of a fish receiving table; a structure forming a chute leading from said table and including a hinged wall; and a rotary beheading cutter extending across the chute adjacent said hinged wall.

18. The combination in a fish cleaning machine of a supporting frame; a receiving table mounted thereon; a structure forming a narrow chute leading from said table and including a hinged plate forming one of its ends; a rotary beheading cutter extending into the chute; means for receiving fish after they have been acted on by the beheading cutter; and means for removing entrails from the fish after they have been acted on by said cutter.

JOHN F. KELLER.

Copies of this patent may be obtained for five cents each, by addressing the "Commissioner of Patents, Washington, D. C."